July 31, 1934.  E. M. MORLEY  1,968,308
AIR SERVICE REEL DEVICE
Filed May 28, 1930
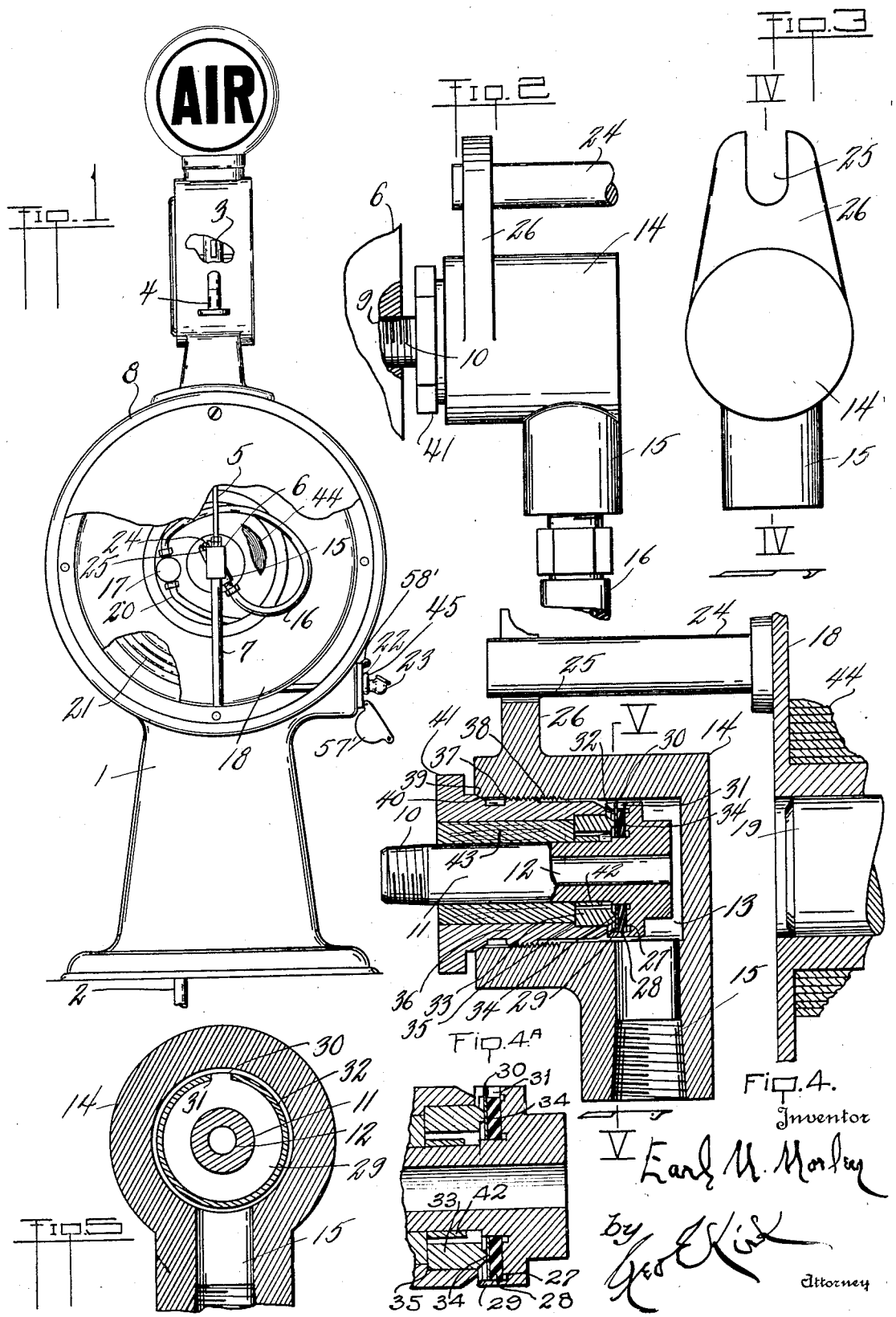

Patented July 31, 1934

1,968,308

UNITED STATES PATENT OFFICE 1,968,308

AIR SERVICE REEL DEVICE

Earl M. Morley, Delta, Ohio, assignor, by mesne assignments, to Harry Haudenschild, Toledo, Ohio Application May 28, 1930, Serial No. 456,340

7 Claims. (Cl. 299—78)

This invention relates to air dispensing equipment.

This invention has utility when incorporated in pneumatic joints for self retrieving reels for tire charging at automobile service stations.

Referring to the drawing:

Fig. 1 is a side elevation, with parts broken away, of an embodiment of the invention;

Fig. 2 is a detail view in side elevation of the fitting unit or joint of Fig. 1;

Fig. 3 is a view from the right of the device of Fig. 2;

Fig. 4 is a section on the line IV—IV, Fig. 3; and

Fig. 5 is a section on the line V—V, Fig. 4.

Standard 1 is shown as having pressure air supply line 2 extending to regulator valve 3 in the upper portion of the standard 1 as adjusted by hand wheel 4 (U. S. Patent 1,736,274, Morley, Nov. 19, 1929). This air supply flows thence by line 5 to block 6 shown as mounted by standard 7 in shell or enlargement 8 of the standard 1. This block 6 is shown as having internally threaded port 9 coacting with externally threaded portion 10 of fitting 11 shown as having port 12 therethrough with clearance chamber 13 in housing 14 having branch way 15 from which extends duct 16 to coupling 17 fast with reel 18 on bearing 19 fixed with the standard 1.

From this coupling 17 extends hose 20 for wraps 21 about the reel 18 and passage therefrom through opening 22 in the standard where such hose is terminally equipped with valve herein shown as check valve or tire chuck terminus 23, which as depressed over a tire valve opens the check to allow the adjusted pressure flow of air from the supply line 2 past the regulator valve 3 and through the hose to the tire.

The block 6 is held by the standard 7 against rotating with the reel 18, while the housing 14 as located adjacent the end of the reel and clear thereof is axially of such reel and held for rotation therewith by pin 24 from the reel engaging the fork 25 of arm 26 from housing 14.

The pressure holding device or connection is in the unit assembled with the duct section fitting or member 11 herein shown as provided with shoulder 27 against which is located elastic gasket or rubber composition packing 28 as a seat for sheet metal bronze bearing disk 29 having tongue 30 engaging in notch 31 of the overhang 32 from the shoulder 27. The bearing disk 29 is accordingly held against rotation relatively to the duct section 11.

Opposing this bearing disk 29 is bearing ring or member 33 having lap-finished steel bearing face 34 against the ring 29. This ring 33 is press fitted into seat 35 of sleeve 36 having externally threaded portion 37 coacting with internally threaded portion 38 of the housing 14. The housing 14 is additionally provided with tapered seat face 39 in snug fitting relation with which may be located taper seat portion 40 of this sleeve 36 having polygonal terminus 41 as a nut.

As assembled in the housing 14, there is swivel connection in that the fitting 11 is held against rotation by the block 6, while the housing 14 as engaged by the pin 24 rotates with the reel 18 and carries therewith the sleeve 36, ring 33 and holding clip or ring 42, as well as a cylindrical member or oil-less wood lateral bearing 43 for the section 11. The clip 42 offers resistance to relative longitudinal shifting between the element 11 and the packing 28. This leaves the non-rotating parts as the fitting 11, the cushion or axially effective take-up means 28, and the bearing plate or disk 29. The rotation is thus limited to occur between the steel ring 33 and the bronze plate or disk 29.

Air under pressure coming into the fitting 11 and passing by duct 12 into the chamber 13 establishes a pneumatic load holding the compression ring 28 as a resilient check control in thrusting the disk 29 against the bearing face 34 of the ring 33. This is accordingly a pneumatic cooperative means maintaiinng the gland at all times tight under a pneumatic action.

For taking down this joint it is only necessary after removing the block 6 to back off the nut portion 41 and thus remove the sleeve 36 and its assembled parts thereon in breaking the air-tight joint 39, 40. The rotative and non-rotative parts are thus in assembly and the fitting 11 may be now thrust clear out of the bearing 43 to carry with it the disk 29 and packing 28.

It is thus seen there is in this device as assembled a pneumatic holding effectiveness for take-up on a thrust bearing seat with the unit load carried by the lateral oil-less bearing 43 and all this apart from the reel structure proper. Automatic retrieving means 44 are provided for the reel 18.

The automatic retrieving means as winding the hose 21 on the reel bring collar or rubber shoulder 45 adjacent the chuck 23 into abutting relation adjacent the opening 22 in a re-winding speed so that the hose 21 is gradually and smoothly retracted into the housing 8 bringing this rubber shoulder 45 against the openings 22 where hood 57' may be swung up to eye 58' and lock applied.

This protects the housing against unwarranted withdrawals in periods of non-use or non-exposure for use of this air service device.

What is claimed and it is desired to secure by Letters Patent is:

1. A reel rotation effecting means extending parallel to the reel axis and away from the reel, a tubular swivel joint embodying a housing, a support for the housing independent of the reel and coaxial with the reel, said housing having means loosely acted upon by said rotation effecting means for causing the housing to rotate with the reel, said joint having a radially extending connection adapted to engage a flexible tubular duct on the reel.

2. For a reel hose supply connection, a swivel joint, there being mounting means for the joint independent of the reel and independent of the support for the reel, loose connection means extending from the reel for turning the joint with the reel, and a conduit from the joint to the hose on the reel.

3. For a reel hose supply connection, a swivel joint, there being mounting means for the joint independent of the reel and approximately coaxial with the reel, a housing for the joint having a radial extension, loose connection means from the reel engaging said extension for rotating the joint housing with the reel, and a conduit from the joint to the hose on the reel.

4. In combination, a hose reel supported at one side for rotation, a supply connection swivelly, concentrically and independently mounted at the other side of said reel, a projection from said reel loosely engaging said connection to cause the connection to be rotatable with said reel, and a flexible conduit leading from said connection to the hose in said reel.

5. In combination, a hose reel supported at one side for rotation, a tubular supply connection to the reel including a swivel joint, means mounting the joint concentrically of the reel at the side of the reel opposite to that on which the reel is supported, a projection from said reel loosely engaging said connection to cause the connection to be rotatable with said reel, and a flexible conduit leading from said connection to the hose in said reel.

6. In combination, a hose reel supported at one side for rotation, a supply duct, a non-rotatable fitting terminus for the duct, means mounting said terminus centrally of the reel at the side of the reel opposite to that on which the reel is supported, a companion fitting rotatably mounted as to said terminus fitting and therewith forming sections of a swivel joint, a projection from the reel loosely engaging said companion fitting to rotate said companion fitting with the reel, and a flexible conduit leading from the companion fitting to the reel.

7. A duct providing swivel joint including relatively rotative members, one of which is angular, a reel adapted to carry wraps of tubular means having communication with the angular member of the joint, supporting means for the other member of the joint for locating the joint axially of the reel, and loose connection cooperative means between the angular member and the reel for holding the reel and angular member for common rotation.

EARL M. MORLEY.